United States Patent
Takahashi et al.

(10) Patent No.: US 6,276,831 B1
(45) Date of Patent: Aug. 21, 2001

(54) ROTARY APPARATUS WITH ASYMMETRICALLY FORMED DYNAMIC PRESSURE GENERATING GROOVES

(75) Inventors: Yuko Takahashi; Naoji Kamimura; Naohiro Ono, all of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/472,094

(22) Filed: Dec. 23, 1999

(30) Foreign Application Priority Data

Jan. 6, 1999 (JP) .................................................. 11-001155

(51) Int. Cl.[7] ...................................................... F16C 32/06
(52) U.S. Cl. .......................... 384/100; 384/107; 384/112; 384/115; 384/123
(58) Field of Search ............................. 384/100, 107–124

(56) References Cited

U.S. PATENT DOCUMENTS

| | | | |
|---|---|---|---|
| 4,678,348 | * 7/1987 | Tielemans et al. | .................. 384/114 |
| 4,798,480 | * 1/1989 | Van Beek | .............................. 384/114 |
| 5,181,783 | * 1/1993 | Sherman et al. | ...................... 384/114 |
| 5,385,408 | * 1/1995 | Tevaarwerk | ........................... 384/115 |
| 5,932,946 | * 8/1999 | Miyasaka et al. | ............... 384/100 X |
| 6,024,493 | * 2/2000 | Tempest et al. | ...................... 384/114 |

* cited by examiner

*Primary Examiner*—Thomas R. Hannon
(74) *Attorney, Agent, or Firm*—Frishauf, Holtz, Goodman, Langer & Chick, P.C.

(57) ABSTRACT

A rotary apparatus includes: a radial fixed member; a rotary unit rotatably supported on the radial fixed member; a radial dynamic pressure bearing portion at which the radial fixed member faces the rotary unit; and dynamic pressure generating grooves formed on the radial dynamic pressure bearing portion. The dynamic pressure generating grooves are asymmetrically formed with respect to a rotary axis of the rotary unit.

43 Claims, 8 Drawing Sheets

FIG. 1
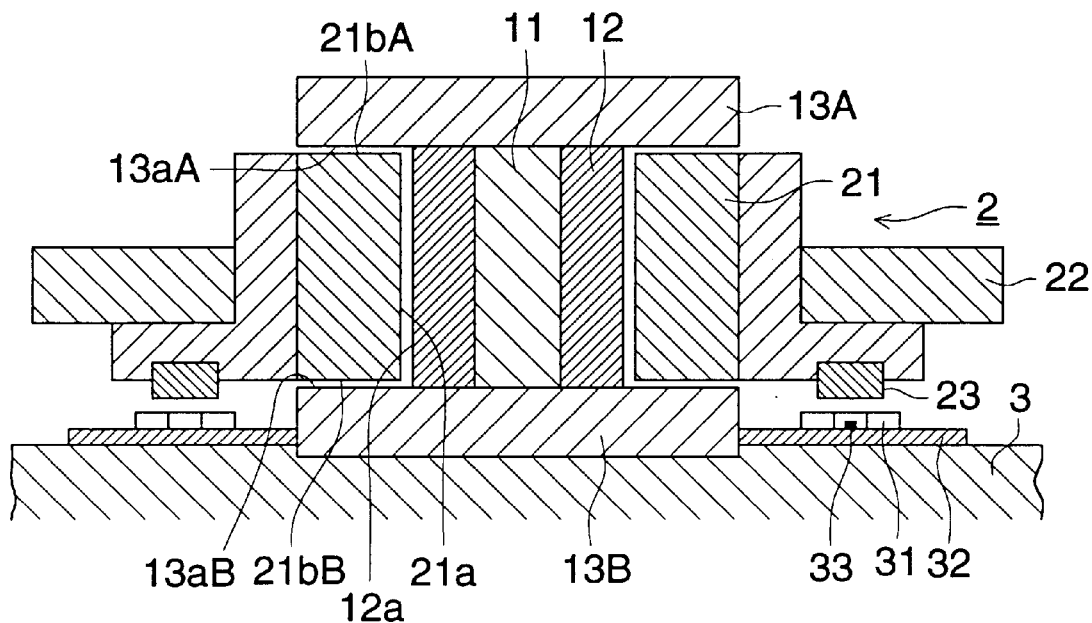
FIG. 2(a)    FIG. 2(b)
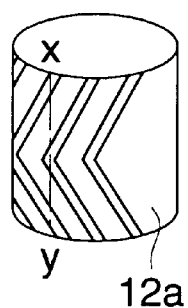
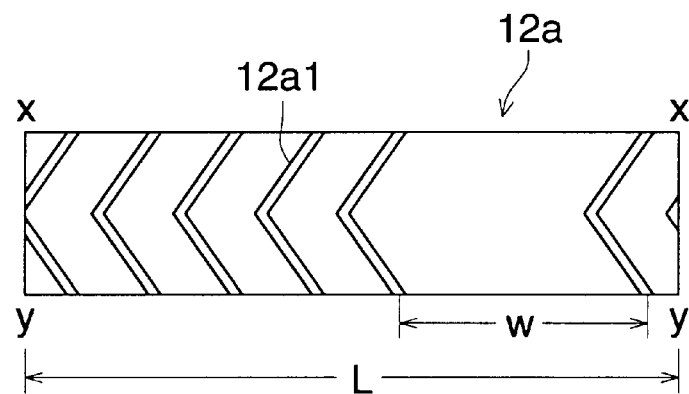

US 6,276,831 B1

ROTARY APPARATUS WITH ASYMMETRICALLY FORMED DYNAMIC PRESSURE GENERATING GROOVES

BACKGROUND OF THE INVENTION

The present invention relates to a rotary apparatus which is rotated at high speed, such as a light deflection apparatus using a polygon mirror, or motors.

In the light deflection apparatus rotating at high speed using the polygon mirror as a rotor, or motors rotating at high speed around a rotation axis, a dynamic pressure bearing is provided between a rotational body and an irrotational body, and the high speed rotation is carried out. FIG. 21 is a sectional view showing an example of the rotary apparatus provided with the dynamic pressure bearing. A rotary unit 102 which rotates facing a radial fixed member 111 which is fixed on a support base 103, is radial dynamic pressure rotated in between both members at the radial dynamic pressure bearing portion 112. Further, on both shaft end portions of the radial fixed member 111, a thrust fixed member 113 which forms a perpendicular surface to the shaft of the radial fixed member 111, is provided, and a rotary unit 102 which is rotated being sandwiched between a thrust fixed member 113A and a thrust fixed member 113B, which are positioned at an upper and a lower portions, is thrust dynamic pressure rotated at a thrust dynamic pressure bearing portion 121.

On the radial dynamic pressure bearing portion 112 and/or the thrust dynamic pressure bearing portion 121, a dynamic pressure generating groove formed symmetrically with the bearing surface is provided, and a wind generated by the high speed rotation of the rotary unit 102 is introduced into the dynamic pressure generating groove, and the strong wind pressure is generated from the symmetrically formed dynamic pressure generating groove, and a gap in several $\mu$m unit is formed between the radial fixed member 111 and the rotary unit 102, and the resistance between them is decreased, thereby, the high speed rotation is attained at the radial dynamic pressure bearing portion 112. Further, a fine gap is formed also between the thrust fixed members 113A, 113B and the rotary unit 102, and while the rotary unit 102 is floated a very little, the high speed rotation is performed at the thrust dynamic pressure bearing portion 121.

In the conventional rotary apparatus provided with the dynamic pressure generating groove which is symmetrical to the dynamic pressure bearing portion, generally, in order to prevent the contact generated during high speed rotation and to decrease the vibration, the dynamic balance is decreased, however, when the dynamic balance is too small, the unstable phenomenon of the rotation is generated on the contrary. In the conventional rotary apparatus, in the adjustment, the upper limit of the dynamic balance is regulated by the tolerance limit of the vibration, and the lower limit is regulated by the tolerance limit of the stability, and the dynamic balance is corrected so that it is within the range between the regulated upper limit and the lower limit, or the gap between the fixed portion of the radial dynamic pressure bearing portion (radial fixed member) and the rotational body (rotary unit) is appropriately adjusted, thereby, the stability in the high speed rotation is obtained.

SUMMARY OF THE INVENTION

An object of the present invention is to provide a rotary apparatus in which the unstableness of rotation does not occur even in an area in which the dynamic balance is small, and the large adjustment range can be obtained, and which has excellent productivity, and can obtain the stable rotation performance in the high speed rotation.

The above object can be attained by any one of the following structures.

(1) A rotary apparatus which has a radial fixed member and a rotary unit which can be rotated to the radial fixed member, and in which dynamic pressure generating grooves are formed in a radial dynamic pressure bearing portion at which the radial fixed member faces the rotary unit, the rotary apparatus is characterized in that the dynamic pressure generating grooves are formed asymmetrically.

(2) A rotary apparatus which has: a radial fixed member; a thrust fixed member arranged in an almost vertical direction to the radial fixed member; and a rotary unit which is in an almost parallel direction to the thrust fixed member and which can be rotated to the radial fixed member, and in which dynamic pressure generating grooves are formed in a thrust dynamic pressure bearing portion at which the thrust fixed member faces the rotary unit, the rotary apparatus is characterized in that the dynamic pressure generating grooves are formed asymmetrically.

(3) A rotary apparatus which has a rotary unit rotatable to the radial fixed member, the rotary apparatus is characterized in that the shape of the radial dynamic pressure bearing portion at which the radial fixed member faces the rotary unit is formed asymmetrically.

(4) A rotary apparatus which has: a radial fixed member; a thrust fixed member arranged in an almost vertical direction to the radial fixed member; and a rotary unit which is in an almost parallel direction to the thrust fixed member and which can be rotated to the radial fixed member, the rotary apparatus is characterized in that the shape of the thrust dynamic pressure bearing portion at which the thrust fixed member faces the rotary unit is formed asymmetrically.

BRIEF DESCRIPTION OF THE DRAWINGS

FIG. 1 is a sectional structural view of a rotary apparatus.

FIG. 2(a) is a perspective view of an inner cylinder bearing of the embodiment (1-1), and FIG. 2(b) is a development thereof.

DETAILED DESCRIPTION OF THE PREFERRED EMBODIMENT

Figure 3:
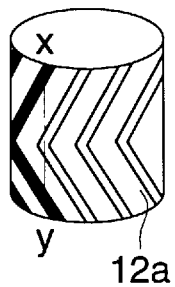
FIG. 3(a) is a perspective view of an inner cylinder bearing of the embodiment (1-2)
FIG. 3(b) is a development thereof.
Figure 3:
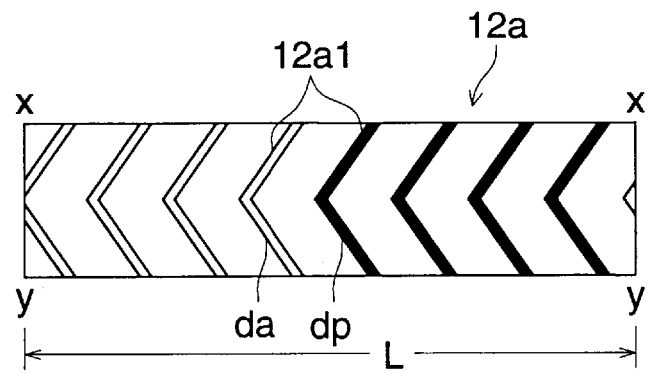

As an embodiment of a rotary apparatus of the present invention, description will be conducted using a light deflection apparatus in which a polygon mirror is fixed to a rotary unit and rotated at high speed. FIG. 1 shows the sectional structure of the rotary apparatus. An inner cylinder bearing 12 made of materials of cylindrical ceramic material or stainless material is fixed outside a fixed radial shaft 11, and a radial fixed member is structured by the radial shaft 11 and the inner cylinder bearing 12. At both side end portions of the inner cylinder bearing 12, the upper thrust bearing 13a and the lower thrust bearing 13B made of the material of disk-like ceramic material or stainless material are fixed in the almost perpendicular direction to the radial shaft, and respectively structure the thrust fixed member. The above-described radial fixed member and the thrust fixed member integrally structure the main body fixed portion of the rotary apparatus, and it is fixed on the support base plate 3.

On the one hand, on the rotary unit 2 which is a unit rotated at high speed, of the rotary apparatus, a cylindrical outer cylinder bearing 21 are integrally provided around the rotational axis, and the outer diameter of the fixed inner cylinder bearing 12 is larger than the inner diameter of the outer cylinder bearing 21 by an adjusted fine gap of several $\mu$m. This inner peripheral surface 21a of the outer cylindrical bearing 21 and the outer peripheral surface 12a of the inner cylinder bearing 12 structure the radial dynamic pressure bearing portion. There is a case in which, on at least one of the outer peripheral surface 12a of the inner cylinder bearing 12 or the inner peripheral surface 21a of the outer cylindrical bearing 21, a plurality of the dynamic pressure generating grooves 12a1 or 12a1(not shown) are formed, or no dynamic pressure generating groove 12a1 is formed. The rotary unit 2 is radial-rotated at the radial dynamic pressure bearing portion to the main body fixed portion.

Further, the upper end surface 21bA of the outer cylinder bearing 21 faces the thrust surface 13aA of the upper thrust bearing 13A, and the lower end surface 21bB of the outer cylinder bearing 21 faces the thrust surface 13aB of the lower thrust bearing 13B, and structure the thrust dynamic pressure bearing portion. On at least one of thrust surfaces 13aA, 13aB of the faced thrust dynamic pressure bearing portion, and upper and lower end surfaces 21bA, 21bB of the outer cylinder bearing 21, a plurality of dynamic pressure generating grooves 13aA1, 13aB1 or 21bA1, 21bB1 (not shown) are formed. The rotary unit 2 is thrust-rotated at the thrust dynamic pressure bearing portion to the main body fixed portion.

In the rotary apparatus (light deflection apparatus) shown in FIG. 1, a polygon-shaped polygon mirror 22 whose end surfaces are mirrors, is adjusted such that the mirror center coincides with the rotation center of the rotary unit 2, and attached to the rotary unit 2.

Further, a permanent magnet 23 for the torque generation which is ring shaped and has multi magnetic pole pairs, is fixed on the bottom surface faced to the support base plate 3 of the rotary unit 2. On the support base plate 3, a print substrate 32 on which a plurality of magnet coils 31 are arranged on the same circle, is attached, and a Hall element 33 to detect the change of the magnetic field is attached in the magnetic coil 31. The Hall element 33 has a function as a speed sensor and a position sensor, and the current control to the magnet coil 4 is conducted according to a detection signal detected by the Hall element 33, and the rotary unit 2 provided with the polygon mirror 22 is rotated at high speed.

In the rotary apparatus using the dynamic pressure bearing, conventionally, the upper limit of the dynamic balance is regulated by the vibration limit and the lower limit thereof is regulated by the stability limit, and the range between the upper limit and the lower limit is the tolerance adjustment range and the adjustment is conducted in that range. However, when the condition of asymmetry of the present invention is added, the unstableness of the rotation does not occur even in the small dynamic balance range, and as the result, (1) The correction range of the dynamic balance adjustment becomes large, and thereby, the production margin is increased.

(2) The adjustment tolerance range of a gap in the radial direction in the radial dynamic pressure bearing portion is enlarged, thereby, the production margin is increased.

(3) The adjust can be carried out even in a range of the small dynamic balance, thereby, the external vibration is decreased.

(4) The unstable vibration in the rotation can be suppressed, and as the result, an allophone generated in the rotation is lowered.

(5) The frictional damage in the dynamic pressure bearing portion due to the unstable vibration in the rotation is prevented, and as the result, the usable life of the rotary apparatus is extended.

(6) The stable rotation can also be obtained in the high speed range, thereby, the higher speed rotation can be attained.

The effects of (1)–(6) can be obtained.

The rotary apparatus of the present invention in which the light deflection apparatus is described as an example, is a rotary apparatus to which the dynamic pressure bearing by which the unstableness of the rotation does not occur even in a area of small dynamic balance, is applied, and will be detailed in the following embodiments.

(Embodiment 1)

This is the embodiment of the present invention, and in the rotary apparatus in which the dynamic pressure generating groove is formed in the radial dynamic pressure bearing portion, the dynamic pressure generating groove is formed asymmetrically to the rotation axis, and this embodiment will be concretely described in more detail below. All of the embodiments described below are examples in which the dynamic pressure generating grooves 12a1 formed on the outer peripheral surface 12a of the inner cylinder bearing 12 are formed asymmetrically to the rotation axis, and it is preferable that, from the view point of easiness of processing of the dynamic pressure generating groove, the dynamic pressure generating groove is provided on the inner cylinder bearing side. The present invention also includes a case in which the dynamic pressure generating groove 21a1 formed on the inner peripheral surface 21a of the outer cylinder bearing 21 is formed asymmetrically to the rotation axis, however, because only the relationship of the outer periphery and the inner periphery is different, the explanation of the inner peripheral surface 21a will be omitted. Next description is the embodiment of the dynamic pressure generating groove provided on the fixed member side.

Embodiment (1-1)

In the embodiment shown in FIGS. 2(a) and 2(b), the dynamic pressure generating groove 12a1 formed on the outer peripheral surface 12a of the inner cylinder bearing 12 is provided with a portion of no groove in the direction of periphery and is made asymmetrical. FIG. 2(a) is a perspective view of the inner cylinder bearing 12, and FIG. 2(b) is a development of the entire circumferential portion of the outer peripheral surface 12a of the inner cylinder bearing 12. According to the consideration of the present inventors, when more than ($\frac{1}{8}$)L no groove portions w is provided to the entire peripheral length L, there is an advantage, and preferably when no groove portions w is provided in the range between more than ($\frac{4}{8}$)L and less than ($\frac{7}{8}$)L to the entire peripheral length L, and more preferably when no groove portions w is provided in the range between more than ($\frac{5}{8}$)L and less than ($\frac{7}{8}$)L to the entire peripheral length L, the effect is conspicuous.

Embodiment (1-2)

In the embodiment shown in 3(a) and 3(b), in the dynamic pressure generating grooves 12a1 with equal intervals formed on the outer peripheral surface 12a of the inner cylinder bearing 12, the dynamic pressure generating groove 12a1 has a plural kinds of different groove depth of a deep groove dp and a shallow groove da in the depth of groove, and is asymmetrical. FIG. 3(a) is a perspective view of the inner cylinder bearing 12, and FIG. 3(b) is a development of the entire circumferential portion of the outer peripheral surface 12a of the inner cylinder bearing 12. When the dynamic pressure generating groove has a deep groove dp in the range of, for example, ($\frac{1}{8}$)L–($\frac{1}{2}$)L, and the other portion of the dynamic pressure generating groove has a shallow groove da, and is asymmetrical, the effect of the present invention can be conspicuously obtained. Of course, the depth of the groove is not limited to 2 stages of the shallow da and the deep dp, but a plural stages of different depths may be allowed, and the depth of the groove may be changed not in the entire area of the dynamic pressure generating groove 12a1, but in only one portion of the dynamic pressure generating groove 12a1.

Embodiment (1-3)

Figure 4:
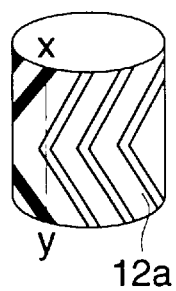
FIG. 4(a) is a perspective view of an inner cylinder bearing of the embodiment (1-3)
FIG. 4(b) is a development thereof.
Figure 4:
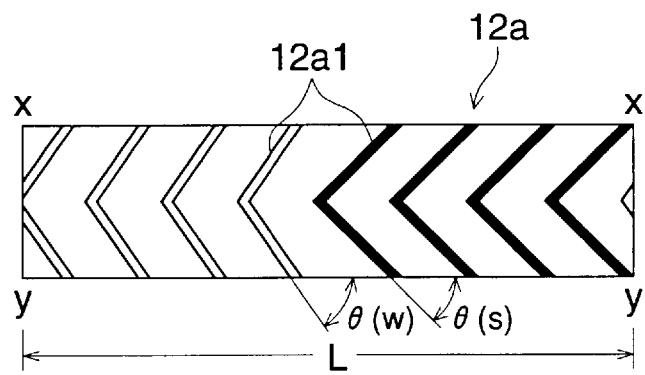

In the embodiment shown in FIGS. 4(a), and 4(b), in the dynamic pressure generating grooves 12a1 with equal intervals formed on the outer peripheral surface 12a of the inner cylinder bearing 12, an air inlet angle (inclination angle) θ of the groove of the dynamic pressure generating groove 12a1 is uneven, and asymmetrical. FIG. 4(a) is a perspective view of the inner cylinder bearing 12, and FIG. 4(b) is a development of the entire circumferential portion of the outer peripheral surface 12a of the inner cylinder bearing 12. The dynamic pressure generating groove has a plurality of different air inlet angles of a lying-shape θ(s) and rising-shape θ(w), and the dynamic pressure generating groove has the lying-shape θ(s) air inlet angle in the range of, for example, ($\frac{1}{8}$)L–($\frac{1}{2}$)L of the entire cicumferential length, and the dynamic pressure generating groove has the rising-shape θ(w) air inlet angle in the other range and the dynamic pressure generating grooves are asymmetrical. Thereby, the effect of the present invention is conspicuously obtained. Of course, the air inlet angle is not limited to 2 stages of the lying-shape θ(s) and rising-shape θ(w), but a plural stages of different air inlet angles may be allowed.

Embodiment (1-4)

Figure 5:
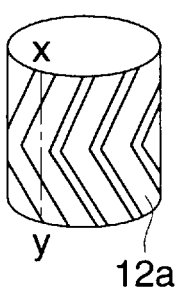
FIG. 5(a) is a perspective view of an inner cylinder bearing of the embodiment (1-4)
FIG. 5(b) is a development thereof.
Figure 5:
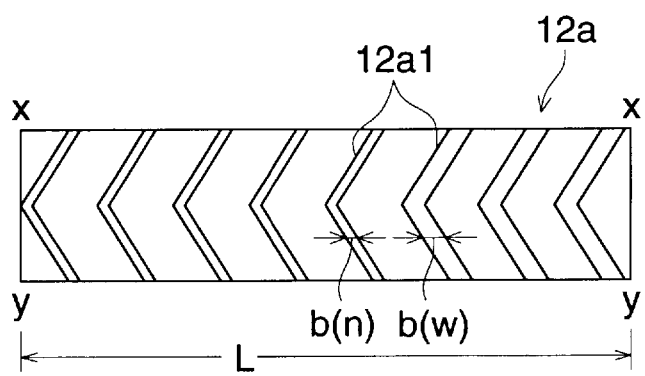

In the embodiment shown in FIGS. 5(a), and 5(b), in the dynamic pressure generating grooves 12a1 with equal intervals formed on the outer peripheral surface 12a of the inner cylinder bearing 12, the dynamic pressure generating groove has a different groove width dynamic pressure generating groove of a wide b(w) groove width dynamic pressure generating groove and a narrow b(n) groove width dynamic pressure generating groove, and is asymmetrical. FIG. 5(a) is a perspective view of the inner cylinder bearing 12, and FIG. 5(b) is a development of the entire circumferential portion of the outer peripheral surface 12a of the inner cylinder bearing 12. The dynamic pressure generating groove has the wide b(w) groove width dynamic pressure generating groove in the range of, for example, ($\frac{1}{8}$)L–($\frac{1}{2}$)L of the entire cicumferential length, and the dynamic pressure generating groove has the narrow b(n) groove width dynamic pressure generating groove in the other range, and the dynamic pressure generating grooves have asymmetrical different groove widths, thereby, the effect of the present invention is conspicuously obtained. Of course, the groove width is not limited to 2 stages of the wide b(w) and narrow b(n) groove widths, but a plural stages of different groove widths may be allowed, and the groove width of only a portion of the dynamic pressure generating grooves, not the entire range thereof, may be changed.

Embodiment (1-5)

Figure 6:
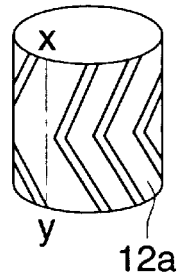
FIG. 6(a) is a perspective view of an inner cylinder bearing of the embodiment (1-5)
FIG. 6(b) is a development thereof.
Figure 6:
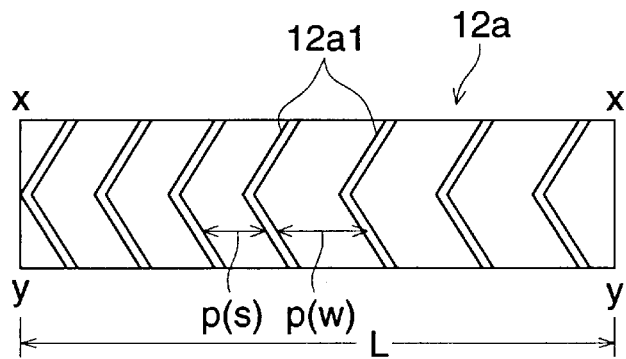

In the embodiment shown in FIGS. 6(a) and 6(b), intervals (pitches) between adjoining grooves of the dynamic pressure generating grooves 12a1 formed on the outer peripheral surface 12a of the inner cylinder bearing 12, are made uneven intervals of a wide interval p(w) portion and a narrow interval p(n) portion, and asymmetrical. FIG. 6(a) is a perspective view of the inner cylinder bearing 12, and FIG. 6(b) is a development of the entire circumferential portion of the outer peripheral surface 12a of the inner cylinder bearing 12. The dynamic pressure generating groove has the wide p(w) dynamic pressure generating groove in which the interval to the adjoining groove is wide p(w), in the range of, for example, ($\frac{1}{8}$)L–($\frac{1}{2}$)L of the entire cicumferential length, and the dynamic pressure generating groove has the narrow p(n) dynamic pressure generating groove in which the pitch of the groove is narrow p(n), in the other range, and the dynamic pressure generating grooves is made asymmetrical, thereby, the effect of the present invention is conspicuously obtained. The interval of adjoining grooves is not limited to 2 stages of the wide p(w) and narrow p(n) intervals, but a plural stages of different groove intervals may be allowed.

Embodiment (1-6)

Figure 7:
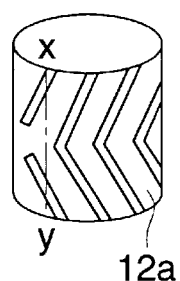
FIG. 7(a) is a perspective view of an inner cylinder bearing of the embodiment (1-6)
FIG. 7(b) is a development thereof.
Figure 7:
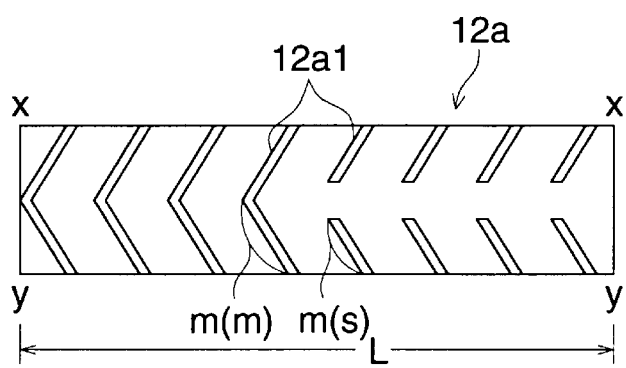

In the embodiment shown in FIGS. 7(a) and 7(b), in the dynamic pressure generating grooves 12a1 with the equal intervals formed on the outer peripheral surface 12a of the inner cylinder bearing 12, the dynamic pressure generating grooves have different groove lengths of the long groove m(m) dynamic pressure generating grooves and the short groove m(s) dynamic pressure generating grooves, and are asymmetrical. FIG. 7(*a*) is a perspective view of the inner cylinder bearing 12, and FIG. 7(*b*) is a development of the entire circumferential portion of the outer peripheral surface 12*a* of the inner cylinder bearing 12. The dynamic pressure generating groove has the long groove m(m) dynamic pressure generating groove in the range of, for example, (⅛)L–(½)L of the entire cicumferential length, and the dynamic pressure generating groove has the short groove m(s) dynamic pressure generating groove in the other range, and when the dynamic pressure generating grooves have different groove lengths and are made asymmetrical, thereby, the effect of the present invention is conspicuously obtained. Of course, the groove length is not limited to 2 stages of the long m(m) and short m(s) groove lengths, but a plural stages of different groove lengths may be allowed.

Embodiment (1-7)

Figure 8:
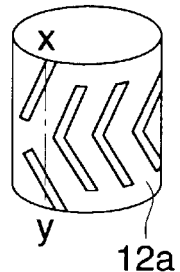
FIG. 8(a) is a perspective view of an inner cylinder bearing of the embodiment (1-7)
FIG. 8(b) is a development thereof.
Figure 8:
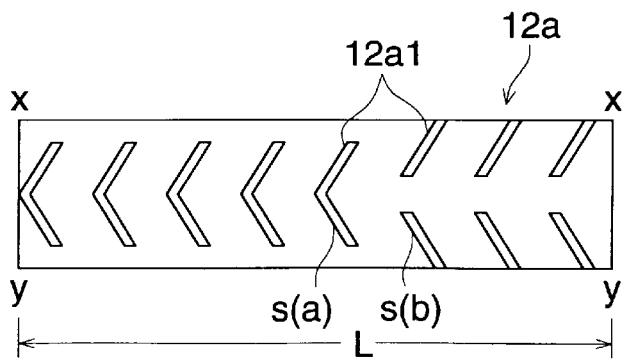

In the embodiment shown in FIGS. 8(*a*) and 8(*b*), in the dynamic pressure generating grooves 12*a*1 with the equal intervals formed on the outer peripheral surface 12*a* of the inner cylinder bearing 12, the dynamic pressure generating grooves have the different groove shape of s(a) and s(b), and are asymmetrical. FIG. 8(*a*) is a perspective view of the inner cylinder bearing 12, and FIG. 8(*b*) is a development of the outer peripheral surface 12*a*. When the dynamic pressure generating grooves of the different groove shape of s(a) and s(b), are made to be appropriately arranged and asymmetrical, the effect of the present invention is obtained.

The embodiment (1-1)—the embodiment (1-7) are embodiments in all of which the dynamic pressure generating grooves of the radial dynamic pressure bearing portion are asymmetrical, and when the dynamic pressure distributions are asymmetrical, the rotation stability can be obtained. Incidentally, the above-described embodiments have elemental characteristics which are respectively made asymmetrical, however, the present invention is not limited to these embodiments, but, the present invention also includes that the shape of the dynamic pressure generating grooves is made asymmetrical, in which more than two elemental characteristics in the embodiment (1-1)—embodiment (1-7) are added to each other and applied, such that, for example, the dynamic pressure generating grooves having plural stages of groove widths (refer to the embodiments (1-4)) are formed to have uneven intervals (refer to the embodiment (1-5)).

(Embodiment 2)

This is the embodiment of the present invention, and in the rotary apparatus in which the dynamic pressure generating grooves is formed in the thrust dynamic pressure bearing portion in which the thrust fixed member faces the rotary unit, the dynamic pressure generating grooves are formed asymmetrical to the rotation axis, and in the rotary apparatus in which the dynamic pressure generating grooves is formed in the upper and lower dynamic pressure bearing portion (the thrust surface 13*a*A of the upper thrust bearing 13*A* and the upper end surface 21*b*A of the outer cylinder bearing 21 facing it) and (the thrust surface 13*a*B of the lower thrust bearing 13B and the lower end surface 21*b*B of the outer cylinder bearing 21 facing it), the dynamic pressure generating grooves is formed asymmetrical, and it will be further detailed concretely below. The embodiments to be described below take the lower thrust dynamic pressure bearing as an example, and in any cases, these are examples in which the dynamic pressure generating grooves 13*a*B1 formed on the thrust surface 13*a*B of the lower thrust bearing 13B are formed asymmetrical to the rotation axis, and according to these, the asymmetrical dynamic pressure distribution is obtained, thereby, the rotational stability is obtained. The present invention also includes a case in which the dynamic pressure generating groove formed on the lower end surface 21*b*B of the outer cylinder bearing 21 is formed asymmetrical to the rotation axis, however, because only the relationship of the fixed surface and the rotation surface is different, the explanation of the dynamic pressure generating grooves formed on the lower end surface 21*b*B is omitted. Next, the embodiment of the dynamic pressure generating grooves provided on the fixed member side will be described.

Embodiment (2-1)

Figure 9:
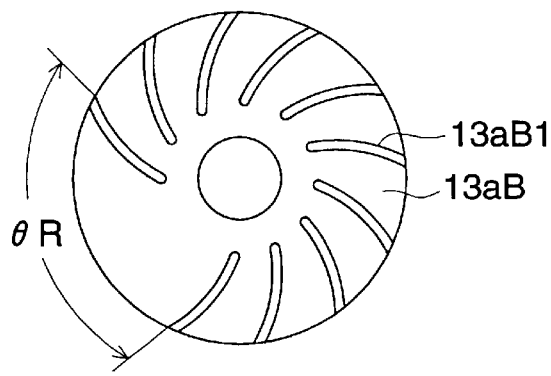
FIG. 9 is a perspective view of an inner cylinder bearing of the embodiment (2-1), and a development thereof.

The embodiment shown in FIG. 9 is a case in which, in the dynamic pressure generating grooves 13*a*B1 formed on the thrust surface 13*a*B of the lower thrust bearing 13B, no-groove portion is formed within the range of an angle θR in the peripheral direction, and the dynamic pressure generating grooves are formed asymmetrical. When the no-groove portion θR is provided within the range between more than 45° and less than 180°, a preferable effect can be obtained.

Embodiment (2-2)

Figure 10:
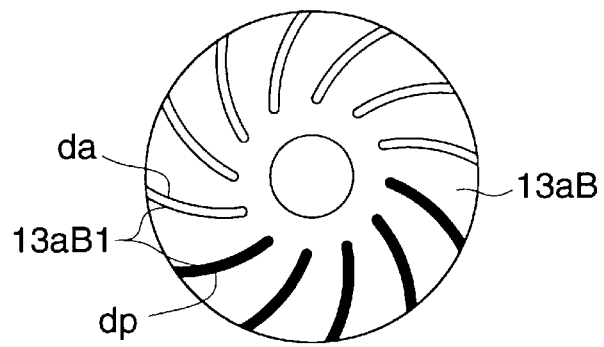
FIG. 10 is a view showing a thrust surface of a lower thrust bearing of the embodiment (2-2).

In the embodiment shown in FIG. 10, in the dynamic pressure generating grooves 13*a*B1 formed on the thrust surface 13*a*B of the lower thrust bearing 13B, the dynamic pressure generating grooves having a plural kinds of depth of the groove such as a deep groove dp and a shallow groove, are formed and are asymmetrical. For example, to the sum total N of dynamic pressure generating grooves 13*a*B1, when adjoining dynamic pressure generating grooves more than (⅛)N and less than (½)N are grooves having the different depth from the other, the preferable effect can be obtained.

Embodiment (2-3)

Figure 11:
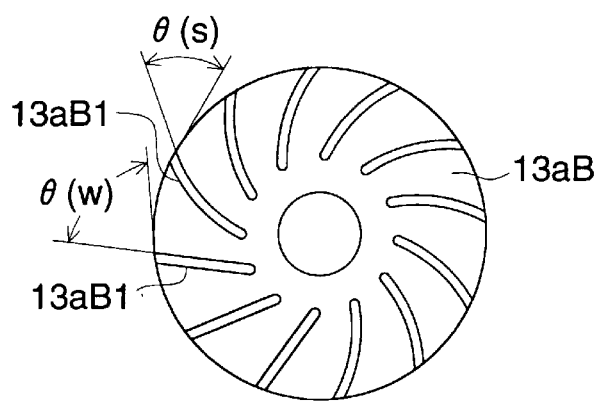
FIG. 11 is a view showing a thrust surface of a lower thrust bearing of the embodiment (2-3).

In the embodiment shown in FIG. 11, in the dynamic pressure generating grooves 13*a*B1 with equal intervals formed on the thrust surface 13*a*B of the lower thrust bearing 13B, the air inlet angle (inclination angle) θ to the groove of the dynamic pressure generating grooves is formed into plural kinds of the air inlet angles of the lying shape θ(s) and rising shape θ(w), and these are unevenly arranged, and asymmetrical.

For example, when, to the sum total N of the dynamic pressure generating grooves 13*a*B1, the air inlet angles of adjoining dynamic pressure generating grooves more than (⅛)N and less than (½)N are different from those of other portions, the preferable effect can be obtained.

Embodiment (2-4)

Figure 12:
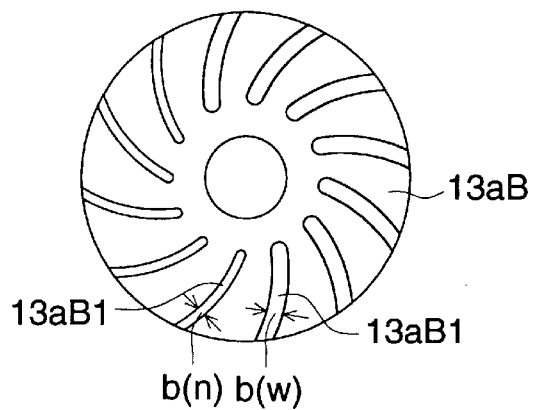
FIG. 12 is a view showing a thrust surface of a lower thrust bearing of the embodiment (2-4).

In the embodiment shown in FIG. 12, in the dynamic pressure generating grooves 13*a*B1 with equal intervals formed on the thrust surface 13*a*B of the lower thrust bearing 13B, the dynamic pressure generating grooves are the dynamic pressure generating grooves having different groove width of the wide groove width b(w) dynamic pressure generating grooves and the narrow groove width b(n) dynamic pressure generating grooves, and are asymmetrical. For example, when, to the sum total N of the dynamic pressure generating grooves 13*a*B1, the groove width of adjoining dynamic pressure generating grooves more than (⅛)N and less than (½)N are different from that of other portions, the preferable effect can be obtained.

Embodiment (2-5)

Figure 13:
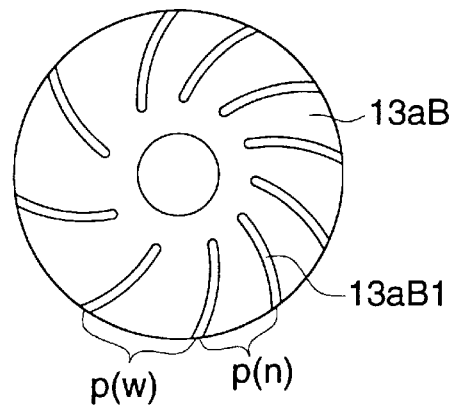
FIG. 13 is a view showing a thrust surface of a lower thrust bearing of the embodiment (2-5).

In the embodiment shown in FIG. 13, in the dynamic pressure generating grooves 13*a*B1 formed on the thrust surface 13*a*B of the lower thrust bearing 13B, the intervals (pitch) of the adjoining grooves are formed into a wide interval p(w) portion and a narrow interval p(n) portion, and are uneven intervals and asymmetrical. When the different groove intervals from the other are provided in the range of (⅛)–(½) of the entire peripheral surface of the thrust surface 13aB, the preferable effect can be obtained.

Embodiment (2-6)

Figure 14:
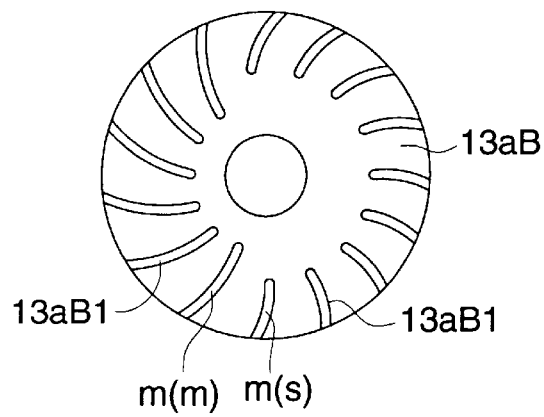
FIG. 14 is a view showing a thrust surface of a lower thrust bearing of the embodiment (2-6).

In the embodiment shown in FIG. 14, in the dynamic pressure generating grooves 13aB1 formed on the thrust surface 13aB of the lower thrust bearing 13B, the dynamic pressure generating grooves having the different groove length of the long groove m(m) dynamic pressure generating grooves and the short groove m(s)dynamic pressure generating grooves are formed, and asymmetrical.

For example, when, to the sum total N of the dynamic pressure generating grooves 13aB1, the groove lengths of adjoining dynamic pressure generating grooves more than (⅛)N and less than (½)N are different from those of other portions, the preferable effect can be obtained.

Embodiment (2-7)

Figure 15:
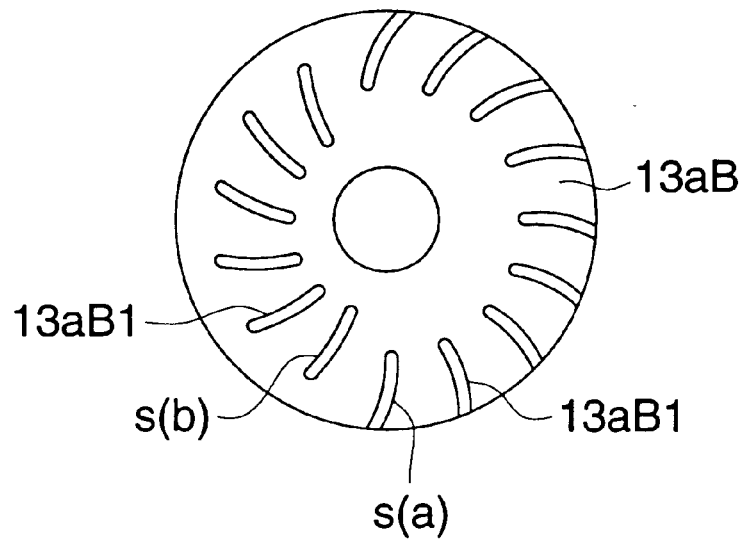
FIG. 15 is a view showing a thrust surface of a lower thrust bearing of the embodiment (2-7).

In the embodiment shown in FIG. 15, in the dynamic pressure generating grooves 13aB1 with equal intervals formed on the thrust surface 13aB of the lower thrust bearing 13B, the dynamic pressure generating grooves have the different groove shape of s(a) and s(b), and are asymmetrical. When the dynamic pressure generating grooves of the different groove shape of s(a) and s(b) are appropriately arranged and asymmetrical, the asymmetrical dynamic pressure distribution is obtained and thereby, the rotational stability can be obtained, and the effect of the present invention is obtained.

The above-described embodiment (2-1) to the embodiment (2-7) are embodiments, in all cases of which the dynamic pressure generating grooves of the thrust dynamic pressure bearing portion are asymmetrical and have elemental characteristics which are respectively made asymmetrical, however, the present invention is not limited to these embodiments, but, the present invention also includes the shape of the dynamic pressure generating grooves, in which more than two elemental characteristics in the embodiment (2-1) to embodiment (2-7) are added to each other and applied, such that, for example, the dynamic pressure generating grooves having plural stages of groove widths (refer to the embodiments (2-4)) are formed in uneven intervals (refer to the embodiment (2-5)).

(Embodiment 3)

This is an embodiment of the present invention, and the shape of the dynamic pressure generating grooves in which the radial fixed portion faces the rotary unit, is formed asymmetrical. In FIG. 1, the radial dynamic pressure bearing portion is formed by the outer peripheral surface 12a of the inner cylinder bearing 12 and the inner peripheral surface 21a of the outer cylinder bearing 21, and in the present invention, the shape of the outer diameter of the inner cylinder bearing 12 or the shape of the inner diameter of the outer cylinder bearing 21 are asymmetrical to the rotation axis. Embodiments to be described below are, in all cases, examples in which the shape of the outer diameter of the inner cylinder bearing 12 is asymmetrical, and by obtaining asymmetrical dynamic pressure distributions, the rotational stability can be obtained. Incidentally, because a case in which the shape of the inner diameter of the outer cylinder bearing 21 is asymmetrical, is the same, the description will be omitted.

Embodiment (3-1)

Figures 16A, 16B:
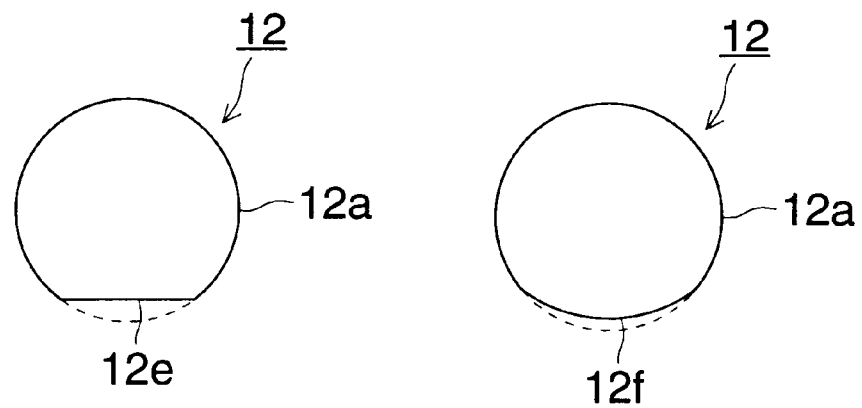
FIGS. 16(a) and 16(b) are the sectional shape of an inner cylinder bearing of the embodiment (3-1).

The embodiment shown in FIGS. 16(a) and 16(b) shows the sectional shape of the inner cylinder bearing 12, and the shape of the outer diameter of the inner cylinder bearing 12 of which the radial dynamic pressure bearing portion is formed, has the sectional shape which is almost true circle excluding a portion, and is asymmetrical. FIG. 16(a) is the embodiment in which a portion is the plane shape 12e, and FIG. 16(b) is the embodiment in which a portion is the cylindrical shape 12f having the diameter different from the true circle diameter. When a portion is made the plane shape 12e or the cylindrical shape 12f, the pressure reduction condition is obtained at the time of the high speed rotation at the position, and thereby, the effect of the present invention is obtained.

Embodiment (3-2)

Figure 17:
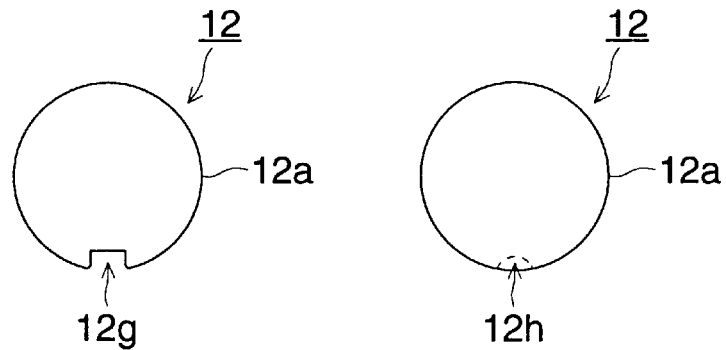
FIGS. 17(a)–17(d) are the sectional shape of an inner cylinder bearing of the embodiment (3-2).
Figure 17:
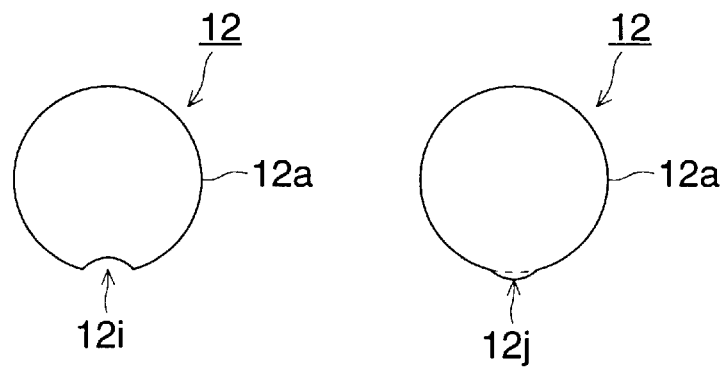

The embodiment shown in FIGS. 17(a) to 17(d) shows the sectional shape of the inner cylinder bearing 12, and the shape of the outer diameter of the inner cylinder bearing 12 of which the radial dynamic pressure bearing portion is formed, has partially a changed portion to a circular cylinder having the sectional shape which is almost true circle, and is asymmetrical. FIG. 17(a) shows an embodiment in which a groove portion 12g parallel to the rotation axis is provided as the changed portion, FIG. 17(b) shows an embodiment in which a single or a plurality of hole portions 12h are provided as the changed portion in the direction of the rotation axis, and FIG. 17(c) shows an embodiment in which a recessed portion 12i is provided in a portion of the outer periphery as the changed portion. In these changed portions, the pressure reduction condition is obtained at the time of high speed rotation, and the dynamic pressure distribution becomes asymmetrical, thereby, the rotational stability is obtained and the effect of the present invention can be obtained. FIG. 17(d) is the reverse to the above-described embodiments, and as the changed portion, a very small protruded portion 12j is provided to the sectional shape which is near the true circle, and according also to such the shape, the effect of the present invention can be obtained.

(Embodiment 4)

This is an embodiment of the present embodiment, and the shape of the thrust dynamic pressure bearing in which the thrust fixed member faces the rotary unit, is formed asymmetrical, and in FIG. 1, the shape of the thrust dynamic pressure bearing portion in which the thrust surface 13aB of the lower thrust bearing 13B faces the upper end surface 21bA of the outer cylinder bearing 21, or the shape of the thrust dynamic pressure bearing portion in which the thrust surface 13aB of the lower thrust bearing 13B faces the lower end portion 21bB of the outer cylinder bearing 21, is formed asymmetrical, thereby, the asymmetrical dynamic pressure distribution is obtained, and thereby, the rotational stability is obtained and the effect of the present invention can be obtained. Embodiments (4-1) and (4-2) which will be described below, are examples in both of which the shape of the thrust surface 13aB of the lower thrust bearing 13B is asymmetrical, however, of course, the present invention is not limited to these embodiments.

Embodiment (4-1)

Figure 18:
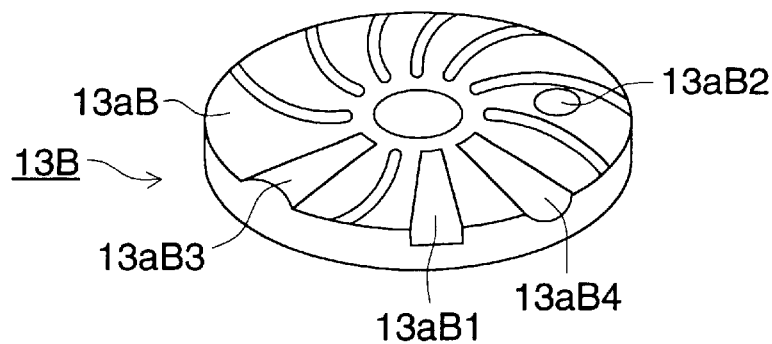
FIG. 18 is a perspective view of a lower thrust bearing of the embodiment (4-1).

In the embodiment shown in FIG. 18, different shape portions are provided on at least one portion, in the peripheral direction of the thrust surface 13aB of the lower thrust bearing 13B, and the shape of the thrust surface is asymmetrical. As shown in the perspective view, for example, a groove portion 13aB1, hole portion 13aB2, protruded portion 13aB3, recessed portion 13aB4, etc., are provided as the different shape portions, and when a single or a plurality of these deferent shape portions are provided on one portion or a plurality of portions, the effect of the present invention is obtained.

Embodiment (4-2)

Figure 19:
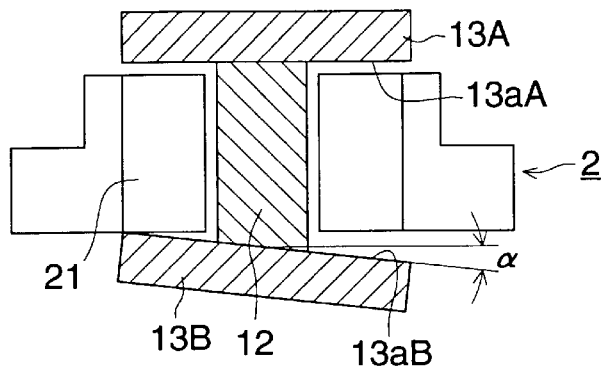
FIG. 19 is an illustration showing the embodiment (4-2).

In the embodiment shown in FIG. 19, the parallelism of the thrust surface 13aA of the upper thrust bearing 13A which is the thrust fixed member arranged vertically on both end portions of the radial fixed member and the thrust surface 13aB of the lower thrust bearing 13B, is slightly ($\alpha°$) inclined to the radial fixed member, and when it is inclined by $\alpha°$ which is experimentally appropriate, and the thrust surface 13aA and the thrust surface 13aB are asymmetrical, then, the dynamic pressure distribution is asymmetrical, thereby, the rotational stability is obtained, and the effect of the present invention can be obtained.

Embodiment (4-3)

Figure 20:
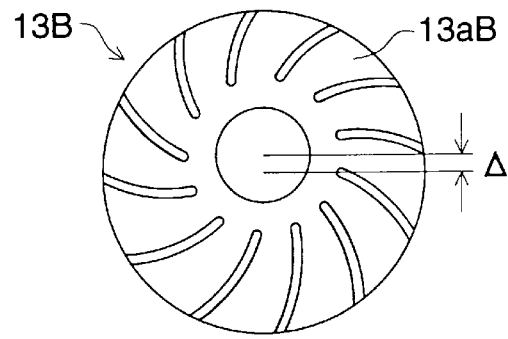
FIG. 20 is a view showing a thrust surface of a lower thrust bearing of the embodiment (4-3).
Figure 21:
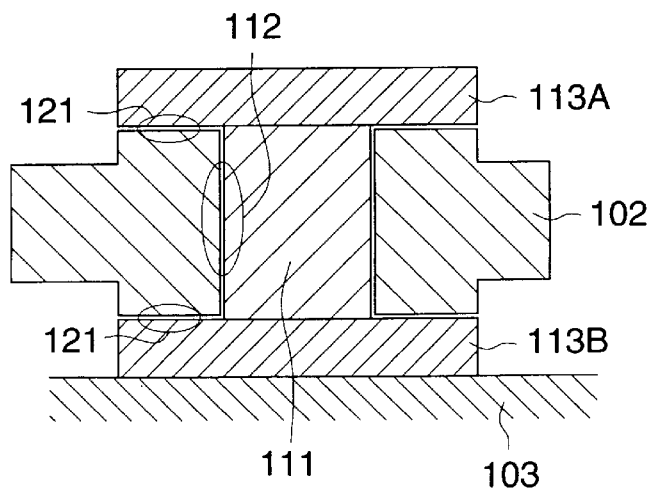
FIG. 21 is a sectional view showing the structure of a rotary apparatus.

In the embodiment shown in FIG. 20, the thrust surface 13aB of the lower thrust bearing 13B is the eccentric shape which is eccentric from the center by $\Delta$, and is asymmetrical. By experimentally obtaining the appropriate $\Delta$ and setting it, the dynamic pressure distribution becomes asymmetrical, thereby, the rotational stability is obtained and the effect of the present invention can be obtained.

In the embodiments described above, in any case, the fixed central axis portion is the radial fixed member, and the embodiment has the structure in which the rotary unit is rotated at high speed through the radial dynamic pressure bearing around it, however, in reverse to this, to the rotary apparatus having the structure in which, to the radial fixed member, the rotary unit including the central axis portion is rotated at high speed through the radial dynamic pressure bearing, the present invention is applied in the entirely same manner.

In the rotary apparatus using the dynamic pressure bearing, conventionally, the upper limit of the dynamic balance is regulated by the vibration limit, and the lower limit thereof is regulated by the limit of stability, and the range between the upper limit and the lower limit is the allowable adjusting range, and adjustment is conducted within the range. In contrast to this, when the condition of asymmetry is added, even in a small dynamic balance range, the rotational unstableness does not occur.

As the result:

(1) The correction area for dynamic balance adjustment is enlarged, as the result, the production margin is increased.

(2) The allowable adjustment range of the gap in the radial direction in the radial dynamic pressure bearing portion is enlarged, thereby, the production margin is increased.

(3) The adjustment can be conducted even in the small dynamic balance area, thereby, the external vibration is reduced.

(4) The unstable vibration at the rotation can be suppressed, thereby, the allophone generated during rotation is reduced.

(5) The frictional damage in the dynamic pressure bearing portion due to the unstable vibration during rotation is avoided, thereby, the usable life of the rotary apparatus is extended.

(6) The stable rotation can be obtained even in the high speed rotation area, thereby, the higher speed rotation can be attained.

According to the present invention, the above-described effects (1) through (6) can be obtained.

What is claimed is:

1. A rotary apparatus comprising:
   (a) a radial fixed member;
   (b) a thrust fixed member arranged substantially in a direction perpendicular to the radial fixed member;
   (c) a rotary unit arranged substantially in parallel to the thrust fixed member and rotatably supported on the radial fixed member;
   (d) a thrust dynamic pressure bearing portion at which the thrust fixed member faces the rotary unit; and
   (e) dynamic pressure generating grooves formed on the thrust dynamic pressure bearing portion,
   wherein the dynamic pressure generating grooves are asymmetrically formed with respect to a rotary axis of the rotary unit.

2. The rotary apparatus of claim 1, wherein the dynamic pressure generating grooves comprise a portion having no groove and a portion having grooves, and the portion having no groove has an angle of not less than 45° not more than 180° with respect to a circumferential direction.

3. The rotary apparatus of claim 1, wherein the dynamic pressure generating grooves are arranged to be spaced apart by equal intervals and comprise a plurality of kinds of grooves different in depth, and a number of adjacent dynamic pressure generating grooves having a deep depth is not less than one eighth and not more than a half of an entire number of dynamic pressure generating grooves.

4. The rotary apparatus of claim 1, wherein the dynamic pressure generating grooves are arranged to be spaced apart by equal intervals and comprise a plurality of kinds of grooves different in entrance angle of air, and a circumferential length of the dynamic pressure generating grooves having a small entrance angle is not less than one eighth and not more than a half of an entire number of dynamic pressure generating grooves.

5. The rotary apparatus of claim 1, wherein the dynamic pressure generating grooves are arranged to be spaced apart by equal intervals and comprise a plurality of kinds of grooves different in width and a number of adjacent dynamic pressure generating grooves having a wide width is not less than one eighth and not more than a half of an entire number of dynamic pressure generating grooves.

6. The rotary apparatus of claim 1, wherein the dynamic pressure generating grooves are arranged to be spaced apart by a plurality of different adjacent groove intervals, and a number of adjacent dynamic pressure generating grooves having a wide adjacent groove interval is not less than one eighth and not more than a half of an entire number of dynamic pressure generating grooves.

7. The rotary apparatus of claim 1, wherein the dynamic pressure generating grooves are arranged to be spaced apart by equal intervals and comprise a plurality of kinds of grooves different in length, and a number of the dynamic pressure generating grooves having a long length is not less than one eighth and not more than a half of an entire number of dynamic pressure generating grooves.

8. The rotary apparatus of claim 1, wherein the dynamic pressure generating grooves are arranged to be spaced apart by equal intervals and comprise a plurality of kinds of grooves different in shape of groove, and a number of dynamic pressure generating grooves having one shape of groove is not less than one eighth and not more than a half of an entire number of dynamic pressure generating grooves.

9. The rotary apparatus of claim 1, wherein the dynamic pressure generating grooves are formed on the radial fixed member.

10. The rotary apparatus of claim 1, wherein the rotary unit is provided on an outer circumferential surface of the radial fixed member.

11. The rotary apparatus of claim 1, wherein the rotary unit includes a polygon mirror.

12. A rotary apparatus comprising:
   (a) a radial fixed member;
   (b) a thrust fixed member arranged substantially in a direction perpendicular to the radial fixed member;
   (b) a rotary unit arranged substantially in parallel to the thrust fixed member and rotatably supported on the radial fixed member; and (c) a thrust dynamic pressure bearing portion at which the thrust fixed member faces the rotary unit, wherein the dynamic pressure bearing portion is asymmetrically formed with respect to a rotary axis of the rotary unit.

13. The rotary apparatus of claim 12, wherein a shape of the thrust fixed member is symmetrically formed with respect to the rotary axis of the rotary unit.

14. The rotary apparatus of claim 12, wherein the rotary unit is provided on an outer circumferential surface of the radial fixed member.

15. The rotary apparatus of claim 12, wherein the rotary unit includes a polygon mirror.

16. A rotary apparatus comprising:
(a) a radial fixed member;
(b) a rotary unit rotatably supported on the radial fixed member;
(c) a radial dynamic pressure bearing portion at which the radial fixed member faces the rotary unit; and
(d) dynamic pressure generating grooves formed on the radial dynamic pressure bearing portion,
wherein the dynamic pressure generating grooves are asymmetrically formed with respect to a rotary axis of the rotary unit; and
wherein the dynamic pressure generating grooves comprise a portion having no groove and a portion having grooves, and the portion having no groove is not less than one eighth and not more than seven eighths of an entire circumferential length of the radial fixed member.

17. The rotary apparatus of claim 16, wherein the dynamic pressure generating grooves are formed on the radial fixed member.

18. The rotary apparatus of claim 16, wherein the rotary unit is provided on an outer circumferential surface of the radial fixed member.

19. The rotary apparatus of claim 16, wherein the rotary unit includes a polygon mirror.

20. A rotary apparatus comprising:
(a) a radial fixed member;
(b) a rotary unit rotatably supported on the radial fixed member;
(c) a radial dynamic pressure bearing portion at which the radial fixed member faces the rotary unit; and
(d) dynamic pressure generating grooves formed on the radial dynamic pressure bearing portion,
wherein the dynamic pressure generating grooves are asymmetrically formed with respect to a rotary axis of the rotary unit; and
wherein the dynamic pressure generating grooves are arranged to be spaced apart by equal intervals and comprise a plurality of kinds of grooves different in depth, and a circumferential length of the dynamic pressure generating grooves having a deep depth is not less than one eighth and not more than a half of an entire circumferential length of the radial fixed member.

21. The rotary apparatus of claim 20, wherein the dynamic pressure generating grooves are formed on the radial fixed member.

22. The rotary apparatus of claim 20, wherein the rotary unit is provided on an outer circumferential surface of the radial fixed member.

23. The rotary apparatus of claim 20, wherein the rotary unit includes a polygon mirror.

24. A rotary apparatus comprising:
(a) a radial fixed member;
(b) a rotary unit rotatably supported on the radial fixed member;
(c) a radial dynamic pressure bearing portion at which the radial fixed member faces the rotary unit; and
(d) dynamic pressure generating grooves formed on the radial dynamic pressure bearing portion,
wherein the dynamic pressure generating grooves are asymmetrically formed with respect to a rotary axis of the rotary unit; and
wherein the dynamic pressure generating grooves are arranged to be spaced apart by equal intervals and comprise a plurality of kinds of grooves different in entrance angle of air, and a circumferential length of the dynamic pressure generating grooves having a small entrance angle is not less than one eighth and not more than a half of an entire circumferential length of the radial fixed member.

25. The rotary apparatus of claim 24, wherein the dynamic pressure generating grooves are formed on the radial fixed member.

26. The rotary apparatus of claim 24, wherein the rotary unit is provided on an outer circumferential surface of the radial fixed member.

27. The rotary apparatus of claim 24, wherein the rotary unit includes a polygon mirror.

28. A rotary apparatus comprising:
(a) a radial fixed member;
(b) a rotary unit rotatably supported on the radial fixed member;
(c) a radial dynamic pressure bearing portion at which the radial fixed member faces the rotary unit; and
(d) dynamic pressure generating grooves formed on the radial dynamic pressure bearing portion,
wherein the dynamic pressure generating grooves are asymmetrically formed with respect to a rotary axis of the rotary unit; and
wherein the dynamic pressure generating grooves are arranged to be spaced apart by equal intervals and comprise a plurality of kinds of grooves different in width, and a circumferential length of the dynamic pressure generating grooves having a wide width is not less than one eighth and not more than a half of an entire circumferential length of the radial fixed member.

29. The rotary apparatus of claim 28, wherein the dynamic pressure generating grooves are formed on the radial fixed member.

30. The rotary apparatus of claim 28, wherein the rotary unit is provided on an outer circumferential surface of the radial fixed member.

31. The rotary apparatus of claim 28, wherein the rotary unit includes a polygon mirror.

32. A rotary apparatus comprising:
(a) a radial fixed member;
(b) a rotary unit rotatably supported on the radial fixed member;
(c) a radial dynamic pressure bearing portion at which the radial fixed member faces the rotary unit; and
(d) dynamic pressure generating grooves formed on the radial dynamic pressure bearing portion,
wherein the dynamic pressure generating grooves are asymmetrically formed with respect to a rotary axis of the rotary unit; and wherein the dynamic pressure generating grooves are arranged to be spaced apart by a plurality of different adjacent groove intervals, and a circumferential length of the dynamic pressure generating grooves having a wide adjacent groove interval is not less than one eighth and not more than a half of an entire circumferential length of the radial fixed member.

33. The rotary apparatus of claim 32, wherein the dynamic pressure generating grooves are formed on the radial fixed member.

34. The rotary apparatus of claim 32, wherein the rotary unit is provided on an outer circumferential surface of the radial fixed member.

35. The rotary apparatus of claim 32, wherein the rotary unit includes a polygon mirror.

36. A rotary apparatus comprising:
    (a) a radial fixed member;
    (b) a rotary unit rotatably supported on the radial fixed member;
    (c) a radial dynamic pressure bearing portion at which the radial fixed member faces the rotary unit; and
    (d) dynamic pressure generating grooves formed on the radial dynamic pressure bearing portion,
    wherein the dynamic pressure generating grooves are asymmetrically formed with respect to a rotary axis of the rotary unit; and
    wherein the dynamic pressure generating grooves are arranged to be spaced apart by equal intervals and comprise a plurality of kinds of grooves different in length, and a circumferential length of the dynamic pressure generating grooves having a long length is not less than one eighth and not more than a half of an entire circumferential length of the radial fixed member.

37. The rotary apparatus of claim 36, wherein the dynamic pressure generating grooves are formed on the radial fixed member.

38. The rotary apparatus of claim 36, wherein the rotary unit is provided on an outer circumferential surface of the radial fixed member.

39. The rotary apparatus of claim 36, wherein the rotary unit includes a polygon mirror.

40. A rotary apparatus comprising:
    (a) a radial fixed member;
    (b) a rotary unit rotatably supported on the radial fixed member;
    (c) a radial dynamic pressure bearing portion at which the radial fixed member faces the rotary unit; and
    (d) dynamic pressure generating grooves formed on the radial dynamic pressure bearing portion,
    wherein the dynamic pressure generating grooves are asymmetrically formed with respect to a rotary axis of the rotary unit; and
    wherein the dynamic pressure generating grooves are arranged to be spaced apart by equal intervals and comprise a plurality of kinds of grooves different in shape of groove, and a circumferential length of the dynamic pressure generating grooves each having one shape of groove is not less than one eighth and not more than a half of an entire circumferential length of the radial fixed member.

41. The rotary apparatus of claim 40, wherein the dynamic pressure generating grooves are formed on the radial fixed member.

42. The rotary apparatus of claim 40, wherein the rotary unit is provided on an outer circumferential surface of the radial fixed member.

43. The rotary apparatus of claim 40, wherein the rotary unit includes a polygon mirror.

* * * * *